(12) United States Patent
Chiu et al.

(10) Patent No.: US 7,738,408 B2
(45) Date of Patent: Jun. 15, 2010

(54) TRANSCEIVER FOR FULL DUPLEX COMMUNICATION SYSTEMS

(75) Inventors: Pao-Cheng Chiu, Taipei Hsien (TW); Chen-Chih Huang, Hsin-Chu Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1490 days.

(21) Appl. No.: 10/907,046

(22) Filed: Mar. 17, 2005

(65) Prior Publication Data

US 2005/0232170 A1  Oct. 20, 2005

Related U.S. Application Data (63) Continuation-in-part of application No. 10/709,935, filed on Jun. 7, 2004, now Pat. No. 7,304,961, and a continuation-in-part of application No. 10/711,294, filed on Sep. 8, 2004, now Pat. No. 7,307,965, and a continuation-in-part of application No. 10/904,338, filed on Nov. 4, 2004, now Pat. No. 7,554,933.

(30) Foreign Application Priority Data

| Jan. 9, 2004 | (TW) | ............................. 93100571 A |
| Jan. 14, 2004 | (TW) | ............................. 93100947 A |
| Mar. 22, 2004 | (TW) | ............................. 93107640 A |

(51) Int. Cl.
*H04L 5/14* (2006.01)
(52) U.S. Cl. .................. 370/276; 370/286; 375/219; 375/222; 375/246; 379/406.01
(58) Field of Classification Search .............. 370/286, 370/276; 375/222, 247, 346, 219; 318/568.22; 327/104; 330/311; 369/44.35; 379/404, 379/406.01; 381/106; 455/550.1; 708/625
See application file for complete search history.

(56) References Cited

U.S. PATENT DOCUMENTS

| 3,942,095 A | * | 3/1976 | Togneri et al. ............... 327/104 |
| 4,283,770 A | * | 8/1981 | Stewart ....................... 708/625 |
| 4,360,713 A | * | 11/1982 | Joel ........................... 370/286 |

(Continued)

FOREIGN PATENT DOCUMENTS

TW   318989   11/1997

(Continued)

OTHER PUBLICATIONS

"15MHz, BiMOS Operational Amplifier with MOSFET Input/ CMOS Output.", Harris Semiconductor, Sep. 1998, pp. 1, 4, CA3130, CA3130A, No. 817.4., Harris Corporation 1998.

*Primary Examiner*—Gerald Gauthier
(74) *Attorney, Agent, or Firm*—Thomas, Kayden, Horstemeyer & Risley (57) ABSTRACT

A transceiver in a full duplex communication system includes a hybrid circuit for transmitting a transmission signal or receiving a receive signal via the channel, the hybrid circuit includes an echo cancellation device for removing transmission signal components from the receive signal; wherein the hybrid circuit outputs a processed receive signal; and a gain amplifier being an OP-RC AGC is directly connected to the hybrid circuit for amplifying the processed receive signal, wherein a first node of the gain amplifier coupled to the echo cancellation device is a virtual ground.

25 Claims, 10 Drawing Sheets

U.S. PATENT DOCUMENTS

| | | | |
|---|---|---|---|
| 4,602,133 A * | 7/1986 | O'Neill | 370/286 |
| 4,937,813 A * | 6/1990 | Schenk | 370/286 |
| 4,972,436 A * | 11/1990 | Halim et al. | 375/247 |
| 5,007,047 A * | 4/1991 | Sridhar et al. | 370/286 |
| 5,287,406 A * | 2/1994 | Kakuishi | 379/404 |
| 5,291,466 A * | 3/1994 | Kwak | 369/44.35 |
| 5,297,163 A * | 3/1994 | Pfeiffer | 375/222 |
| 5,463,695 A * | 10/1995 | Werrbach | 381/106 |
| 5,528,687 A | 6/1996 | Tanaka | |
| 5,581,166 A * | 12/1996 | Eismann et al. | 318/568.22 |
| 5,586,181 A * | 12/1996 | Kiko | 379/399.01 |
| 5,694,474 A | 12/1997 | Ngo et al. | |
| 5,812,537 A | 9/1998 | Betts et al. | |
| 5,960,077 A | 9/1999 | Ishii et al. | |
| 6,278,785 B1 | 8/2001 | Thomasson | |
| 6,373,908 B2 * | 4/2002 | Chan | 375/346 |
| 6,775,529 B1 | 8/2004 | Roo | |
| 6,915,141 B2 * | 7/2005 | Loke | 455/550.1 |
| 6,937,104 B1 * | 8/2005 | Varadarajan et al. | 330/311 |
| 6,947,478 B1 * | 9/2005 | Hauptmann et al. | 375/222 |
| 6,965,578 B1 | 11/2005 | Kappes | |
| 6,980,644 B1 | 12/2005 | Sallaway et al. | |
| 7,139,342 B1 | 11/2006 | Phanse | |
| 7,269,211 B2 * | 9/2007 | Lin et al. | 375/222 |
| 7,304,961 B2 * | 12/2007 | Huang et al. | 370/286 |
| 7,307,965 B2 | 12/2007 | Huang | |
| 7,457,386 B1 | 11/2008 | Phanse | |
| 2002/0101983 A1 | 8/2002 | Lee | |
| 2003/0169875 A1 | 9/2003 | Lee | |
| 2003/0214903 A1 | 11/2003 | Lee | |
| 2005/0084003 A1 | 4/2005 | Duron | |
| 2005/0094583 A1 * | 5/2005 | Gupta et al. | 370/286 |

FOREIGN PATENT DOCUMENTS

| | | |
|---|---|---|
| TW | 507433 | 10/2002 |

* cited by examiner

TRANSCEIVER FOR FULL DUPLEX COMMUNICATION SYSTEMS

CROSS REFERENCE TO RELATED APPLICATIONS

This is a continuation-in-part of U.S. application Ser. No. 10/709,935, filed Jun. 7, 2004, entitled "ECHO CANCELLATION DEVICE FOR FULL DUPLEX COMMUNICATION SYSTEMS", which issued on Dec. 4, 2007, as U.S. Pat. No. 7,304,961, U.S. application Ser. No. 10/711,294, filed Sep. 8, 2004, entitled "ECHO CANCELLATION DEVICE FOR FULL DUPLEX COMMUNICATION SYSTEMS", which issued on Dec. 11, 2007, as U.S. Pat. No. 7,307,965, U.S. application Ser. No. 10/904,338, filed Nov. 4, 2004, entitled "ECHO CANCELLATION DEVICE FOR FULL DUPLEX COMMUNICATION SYSTEMS", which issued on Jun. 30, 2009, as U.S. Pat. No. 7,554,933, which are cooperated by reference herein.

BACKGROUND OF INVENTION

1. Field of the Invention

The present invention relates to a transceiver, and more particularly, to a transceiver for a full duplex communication system.

2. Description of the Prior Art

Figure 1:
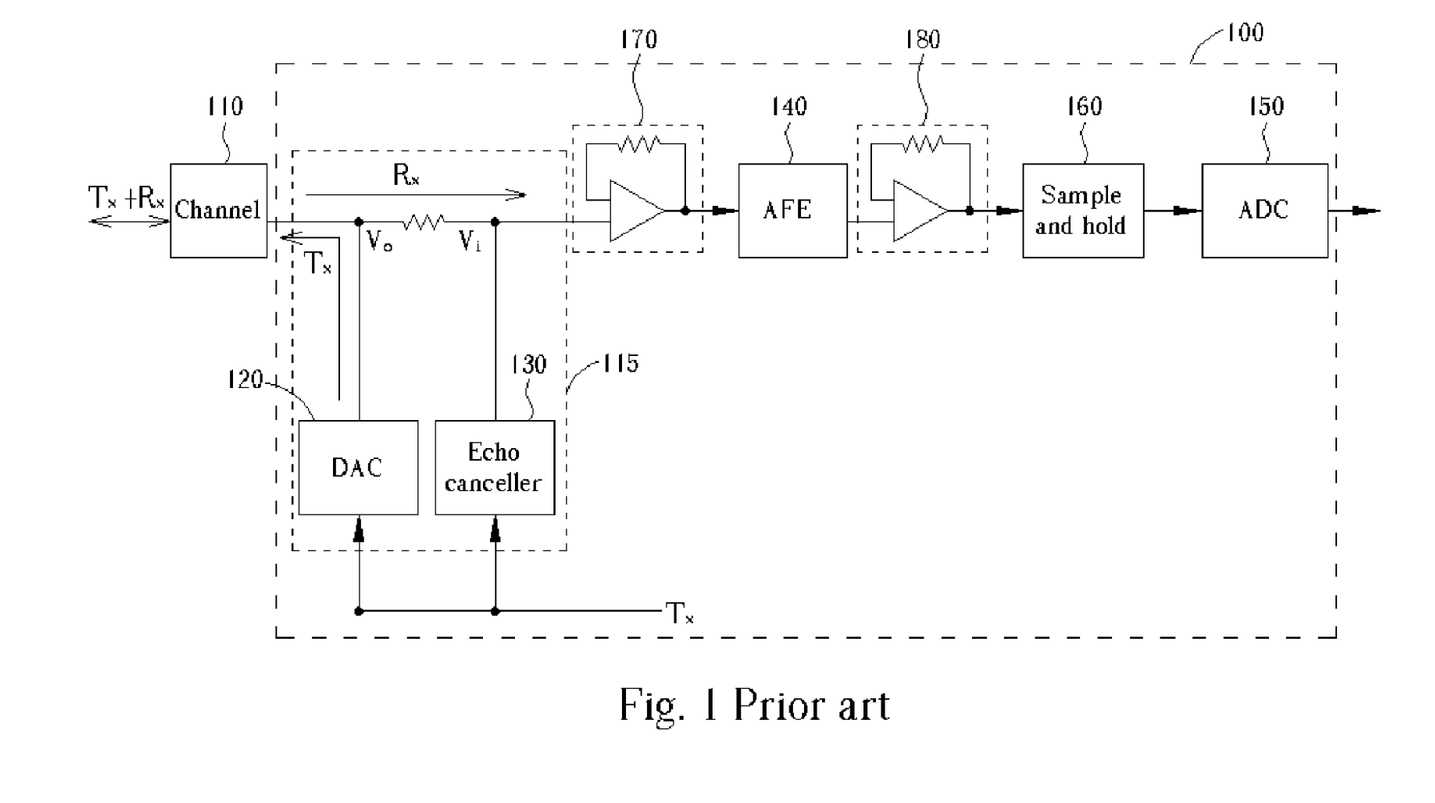
FIG. 1 is a simplified schematic diagram of a transceiver in a channel of a fast Ethernet device according to the prior art.
Figure 2:
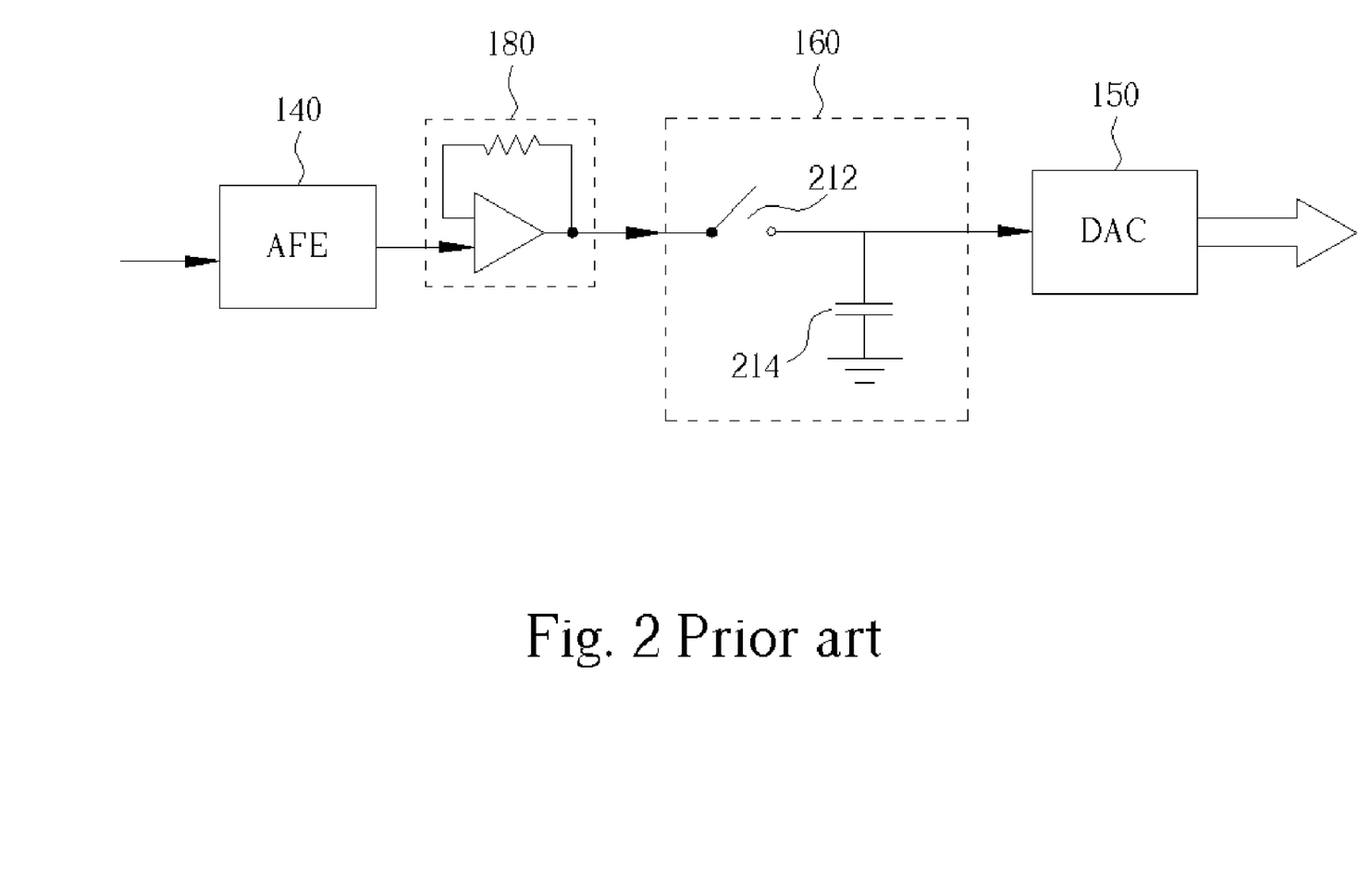
FIG. 2 is a schematic diagram of a portion of the transceiver of FIG. 1.

As technology advances, network applications have become more and more popular. FIG. 1 depicts a simplified schematic diagram of a conventional transceiver 100 in a channel of a fast Ethernet device. The transceiver 100 comprises a hybrid circuit 115, which is a three-end device. The transceiver 100 transmits a transmission signal Tx to the channel 110 via the hybrid circuit 115. A receive signal Rx transmitted from the other end of the channel 110 mixes with the signal Tx to form a signal Rx+Tx. The hybrid circuit 115 comprises an echo canceller 130 for removing the components of the signal Tx from the signal Rx+Tx in the channel 110 in order to obtain the receive signal Rx. The transceiver 100 further comprises an analog front-end (AFE) circuit 140 coupled to the hybrid circuit 115 for receiving and processing the receive signal Rx. In practical applications, the hybrid circuit 115 further comprises a digital to analog converter (DAC) 120.

However, an unavoidable parasitic capacitance effect in practical implementations is disregarded and therefore the echo effect of the transceiver 100 cannot be effectively reduced. Additionally, the open-loop output impedance of the hybrid circuit 115 is a finite resistance Ra and the input impedance of the AFE circuit 140 is a finite resistance Rb. Accordingly, the signal insertion loss is Ra/(Ra+Rb) and the equivalent output impedance of the stage prior to the AFE circuit 140 is Ra//Rb. The signal-to-noise ratio (SNR) of the receive signal Rx is thereby reduced. Therefore, the conventional transceiver 100 includes a unit gain buffer 170 prior to the AFE circuit 140 to provide a large input impedance and a tiny output impedance in order to drive the next stage, i.e., the AFE circuit 140, and to prevent any signal from passing back from the AFE circuit 140 to the hybrid circuit 115.

Furthermore, in order to increase the working frequency of the sample and hold circuit 160, the conventional transceiver 100 also includes a unit gain buffer 180 between the AFE circuit 140 and a sample and hold circuit 160 to provide a small output impedance to reduce the equivalent resistance of the RC network.

The transceiver of the prior art utilizes unit gain buffers to drive next stages and this results in increased complexity and cost of the circuit, and the noise level and harmonic distortion of the active elements within are raised. Hence the signal quality decreases.

SUMMARY OF INVENTION

It is therefore an objective of certain claimed embodiments to provide a transceiver having simple circuit design to solve the above problem.

According to a preferred embodiment, a transceiver in a communication system is disclosed. The transceiver includes: a hybrid circuit coupled to a channel for transmitting a transmission signal and receiving a receive signal via the channel, the hybrid circuit having an echo cancellation device for removing the transmission signal from the receive signal; wherein the hybrid circuit outputs a processed receive signal; and a gain amplifier being an OP-RC AGC directly connected to the hybrid circuit for amplifying the processed receive signal, and a first node of the gain amplifier coupled to the echo cancellation device is a virtual ground.

According to certain embodiments, the parasitic capacitance effect is minimized and the echo cancellation performance is optimized. Furthermore, no unit gain buffers are required to drive next stages so that the complexity, the cost, and the power consumption are reduced. In addition, the noise and harmonic distortion of active elements are decreased and the signal quality is improved.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
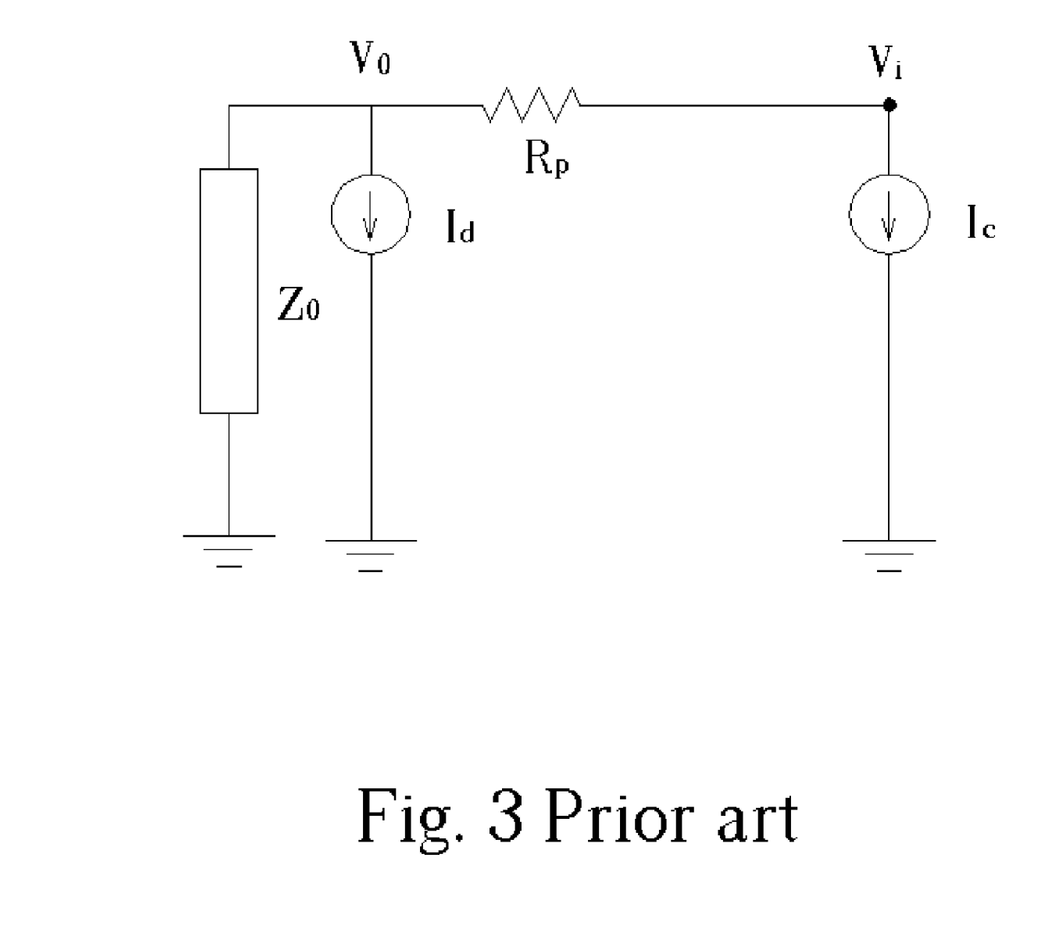
FIG. 3 is a small signal model of the hybrid circuit of FIG. 1.

FIG. 3 depicts a small signal model of the hybrid circuit 115 of FIG. 1. In FIG. 3, the equivalent circuit of the DAC 120 is a current source Id, the equivalent circuit of the echo canceller 130 is a current source Ic, and Zo is the equivalent output impedance of the DAC 120. In order to achieve echo cancellation for the AFE circuit 140, the effect caused by the output of the current source Id must be canceled by the output of the current source Ic. From the small signal model shown in FIG. 3, the following formula can be obtained:

$$Vi = -[IdZo + (Zo + Rp)Ic] \quad (1)$$

In order to cancel the echo effect, Vi should equal 0, which satisfies:

$$IdZo+(Zo+Rp)Ic=0 \quad (2)$$

From formula (2), it is known that the relationship between Ic and Id is:

$$Ic = \frac{-Zo}{Rp + Zo} Id \quad (3)$$

Figure 4:
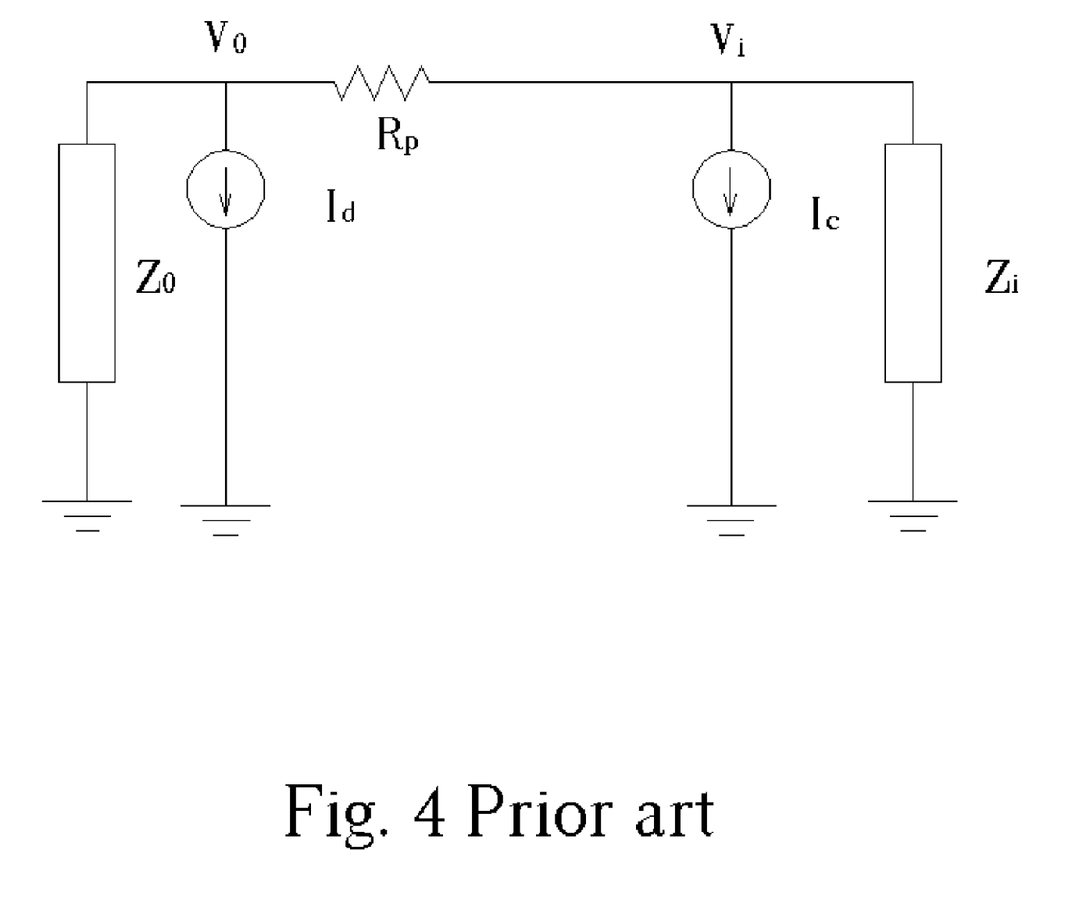
FIG. 4 is another small signal model of the hybrid circuit of FIG. 1.

Adding an impedance Zi between an echo free point and a grounding point into FIG. 3, the small signal model of the hybrid circuit 115 shows in FIG. 4. At that moment, the following formula is obtained by solving KVL or KCL equations:

$$Vi = \frac{-Zi[IdZo + (Zo + Rp)Ic]}{Rp + Zi + Zo} \quad (4)$$

Similarly, if Vi equals 0, it also satisfies formula (2):

$$IdZo+(Zo+Rp)Ic=0 \quad (2)$$

And it also satisfies formula (3):

$$Ic = \frac{-Zo}{Rp + Zo} Id \quad (3)$$

In other words, if the equivalent current source Ic satisfies formula (3), the echo effect can be completely cancelled, and the impedance Zi can be arbitrary. Accordingly, if the grounding point is replaced with a virtual ground, the above analysis is unchanged.

For the unavoidable parasitic capacitance effect of practical implementations in the present invention, the equivalent output impedance Zo is modified to being parallel connection with a load resistor Re, which consists of the matching resistor Rm and the equivalent resistor Rc of the channel, and a parasitical capacitor Ce. The effective output impedance Zo=Re//Ce can be represented as the following formula:

$$Zo = \frac{Re}{sReCe + 1} \quad (5)$$

Substitute formula (5) into formula (3) to obtain the following formula:

$$Ic = \frac{-Re}{Rp + Re + sReRpCe} Id = H(s) \cdot Id \quad (6)$$

From formula (6), the relationship between Ic and Id is actually a low pass transfer function H(s).

Figure 5:
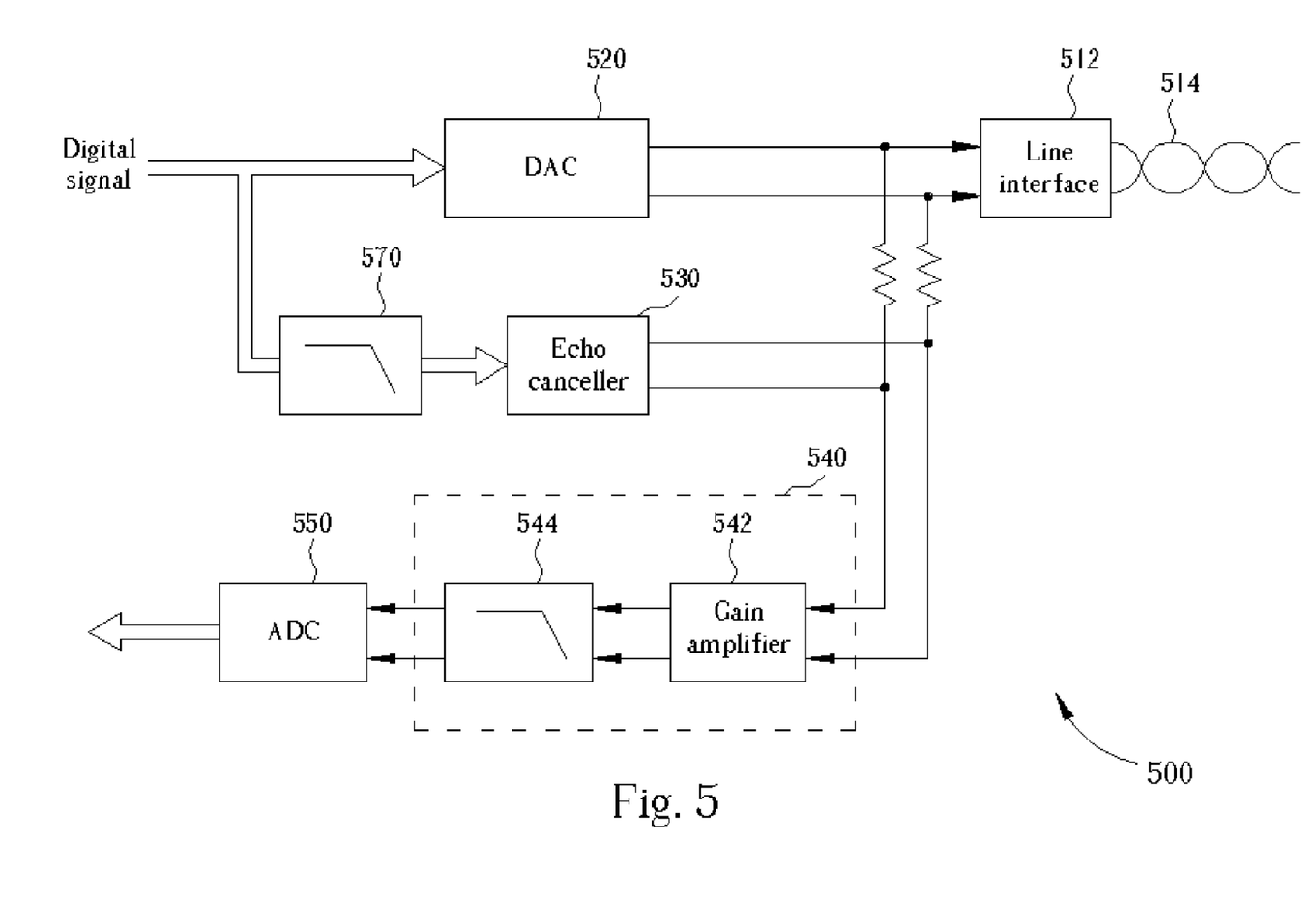
FIG. 5 is a simplified schematic diagram of a transceiver according to a first embodiment of the present invention.

FIG. 5 depicts a schematic diagram of a transceiver 500 of a full duplex communication system according to a first embodiment of the present invention. In the transceiver 500, the AFE circuit 540 comprises a gain amplifier 542 for adjusting the amplitude of the receive signal to increase the signal gain; and a filter 544 coupled to the gain amplifier 542 for filtering noises or harmonic components of the signal outputted from the gain amplifier 542 and for driving the next stage.

Preferably, the gain amplifier 542 is a programmable gain amplifier (PGA) and the filter 544 is an OP-RC filter.

Figure 6:
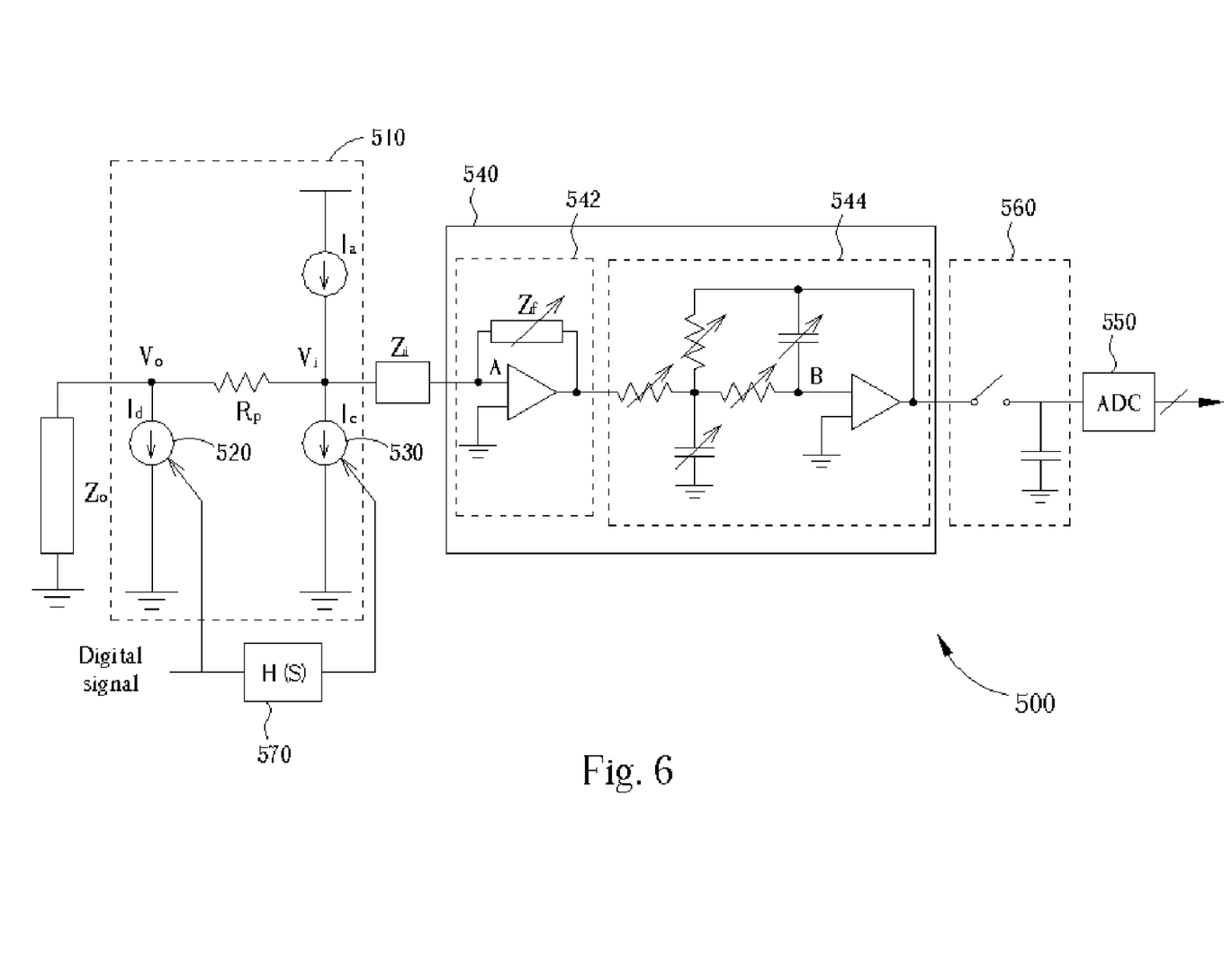
FIG. 6 is an equivalent circuit diagram of the transceiver of FIG. 5.

The block H(s) 570 shown in FIG. 6 is a low pass transfer function and can be implemented to satisfy formula (6) by either digital means or analog means. For example, a digital low pass filter can be employed to implement the block H(s). In another embodiment of the present invention, an RC network low pass filter is employed to implement the block H(s). A capacitor of the RC network low pass filter can be a metal stacked-layer capacitor or a parasitic capacitor, and a resistor of the RC network low pass filter can be a MOS transistor of which the resistance depends on the gate voltage. In a preferred embodiment of the present invention, a pull-up current source equivalent to the current source Ia in FIG. 6 is employed to increase the DC level of Vi and the MOS transistors of the equivalent current source Ic can maintain the operation in the saturation region to avoid signal distortion. The echo cancellation performance of the transceiver 500 of the present invention is thereby improved. In practical implementations, the pull-up current source, which is the equivalent current source Ia can be a fixed current source or an adjustable current source, meaning that the output of the equivalent current source Ia can be a DC or an AC signal with a fixed DC level, or a DC or an AC signal with a DC level corresponding to the magnitude of the current source Ic.

As shown in the foregoing illustration, using the low pass filter 570 according to the present invention can minimize the echo effect of the transceiver 500.

In the transceiver 500 of the present invention, the gain amplifier 542 of the AFE circuit 540 is implemented with an OP-RC architecture and the input impedance Zi of the gain amplifier 542 can be a resistor. One terminal of the input impedance Zi is coupled to a node A and the other terminal of the input impedance Zi is coupled to the echo free point of the transceiver 500. The node A can be regarded as a virtual ground point due to the high loop gain property of the OP-RC architecture. According to the above analysis, the magnitude of the input impedance Zi does not affect the operation of echo cancellation of the low pass filter 570 and the echo canceller 530. As a result, the ability of adjusting the gain of the gain amplifier 542 is substantially raised. In addition, since the gain amplifier 542 is implemented using the OP-RC architecture, a small output impedance is thereby obtained so that the gain amplifier 542 is an ideal driver stage to drive the next stage such as the filter 544. Therefore, no unit gain buffer in the transceiver 500 is required to be an intermediate stage between the AFE circuit 540 and its preceding stage. The cost, complexity, power consumption, noise, and harmonic distortion are thereby reduced.

In a multi-channel communication system, cross talk easily happens in high frequency. Generally, in a full duplex communication system, the echo residue input to the AFE circuit 540 usually corresponds to high-frequency components. Therefore, the filter 544 is employed in the transceiver 500 to filter the echo residue corresponding to the high-frequency components. In one embodiment, the filter 544 is an OP-RC filter with a small output impedance and drives the next stage. If a sample and hold circuit 560 is configured following the filter 544 and prior to an analog to digital converter (ADC) 550, the small output impedance of the filter 544 reduces the equivalent time constant of a RC network formed by the sample and hold circuit 560 and therefore the working frequency of the sample and hold circuit 560 is increased.

Figure 7:
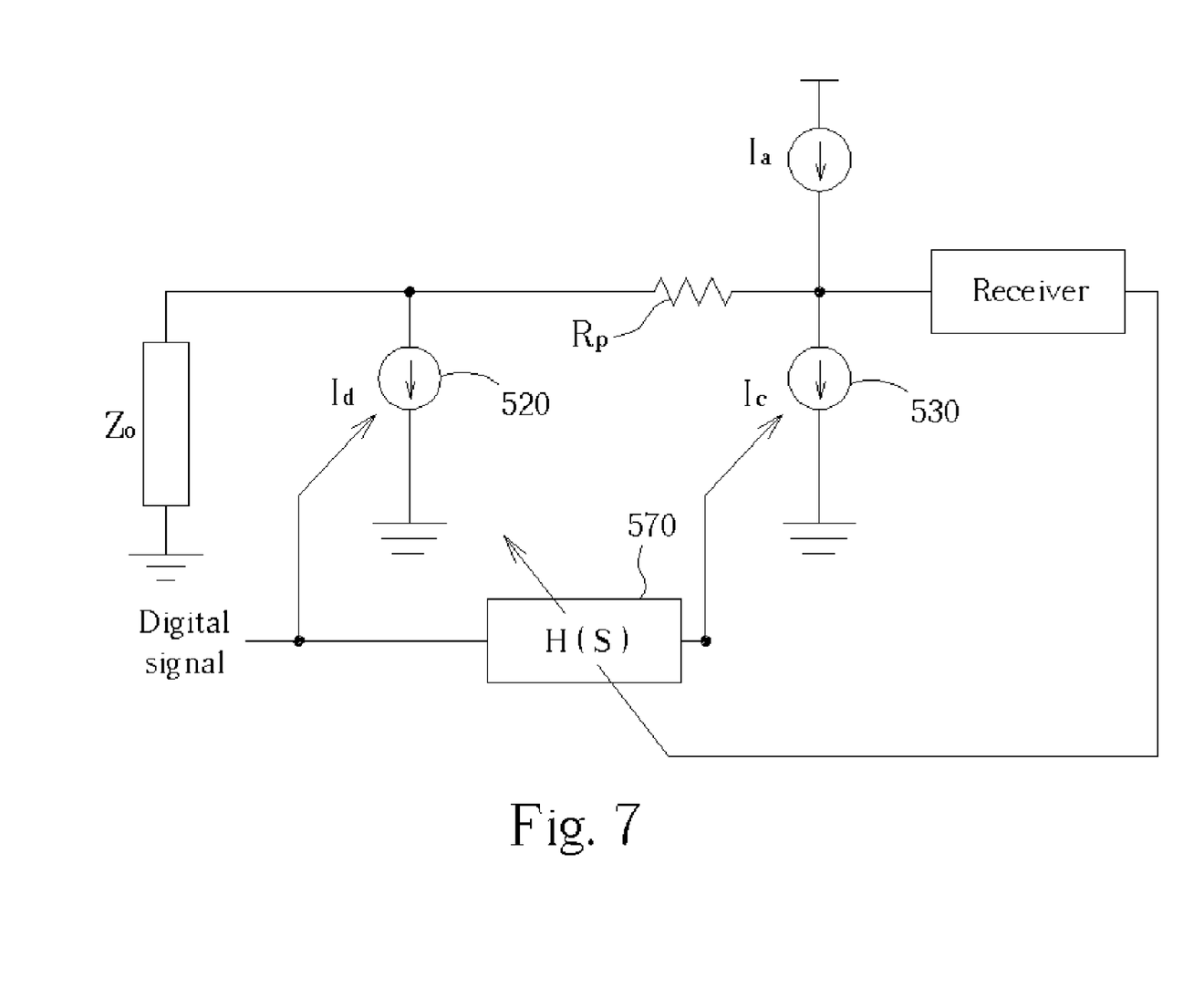
FIG. 7 is a simplified equivalent circuit diagram of another embodiment the transceiver of FIG. 5.

In practical implementations, the capacitance of the parasitic capacitor Ce, the resistance of resistor Rc equivalent to the channel, and the impedance of the matching resistor Rm change with the operating environment, temperature, manufacturing deviations, or other variations. In order to more precisely eliminate the echo, the transceiver 500 of the present invention further comprises an echo residue detector (not shown) coupled to the ADC 550 for detecting the echo residue received. The echo residue detector generates a control signal according to the detected echo residue and outputs the control signal to the low pass filter 570 to adjust the poles of the low pass transfer function H(s) for minimizing the echo residue. FIG. 7 depicts a simplified equivalent circuit diagram of the above embodiment.

In the above embodiments, the hybrid circuit is assumed to operate in current mode. In fact, the concept and architecture of the present invention for eliminating echo can also be applied in a transceiver with a hybrid circuit that operates in voltage mode.

Figure 8:
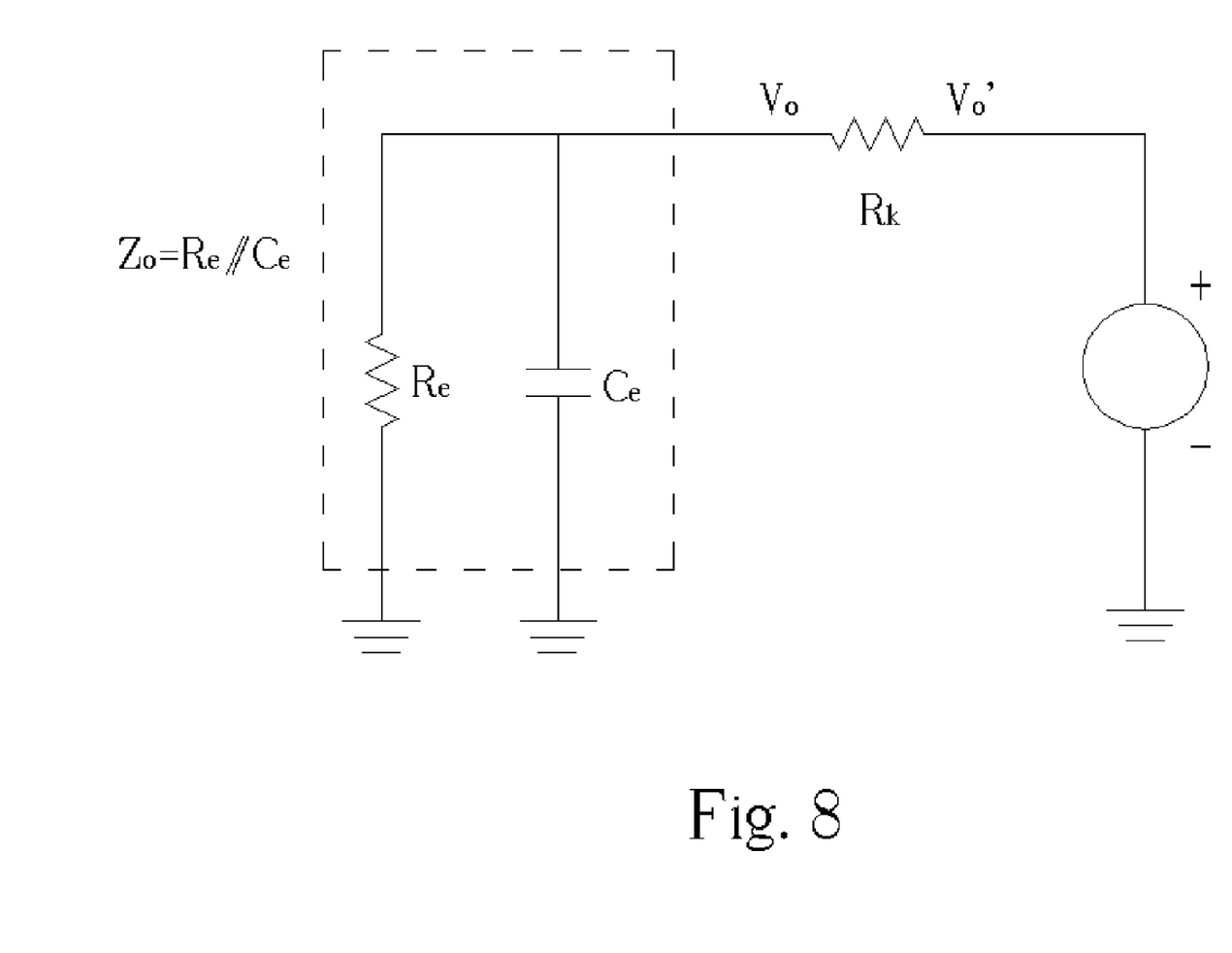
FIG. 8 is a simplified equivalent circuit diagram of a line driver.

FIG. 8 depicts a simplified equivalent circuit diagram of a line driver. Vo' is the output of the line driver, Rk is a matching resistance, Vo is a transmission signal to be transmitted via a channel, Re is an equivalent load resistor, and Ce is a parasitic capacitance. Considering the effect of the parasitic capacitance, the equivalent output impedance Zo of the line driver is the parallel connection of the load resistor Re and the parasitical capacitor Ce, i.e., Zo=Re//Ce. From the circuit diagram shown in FIG. 8, the following formula is obtained:

$$Vo = \frac{Zo}{Zo+Rk}Vo' = \frac{Re}{Rk+Re+sReRkCe}Vo' = h(s)\cdot Vo' \quad (7)$$

Figure 9:
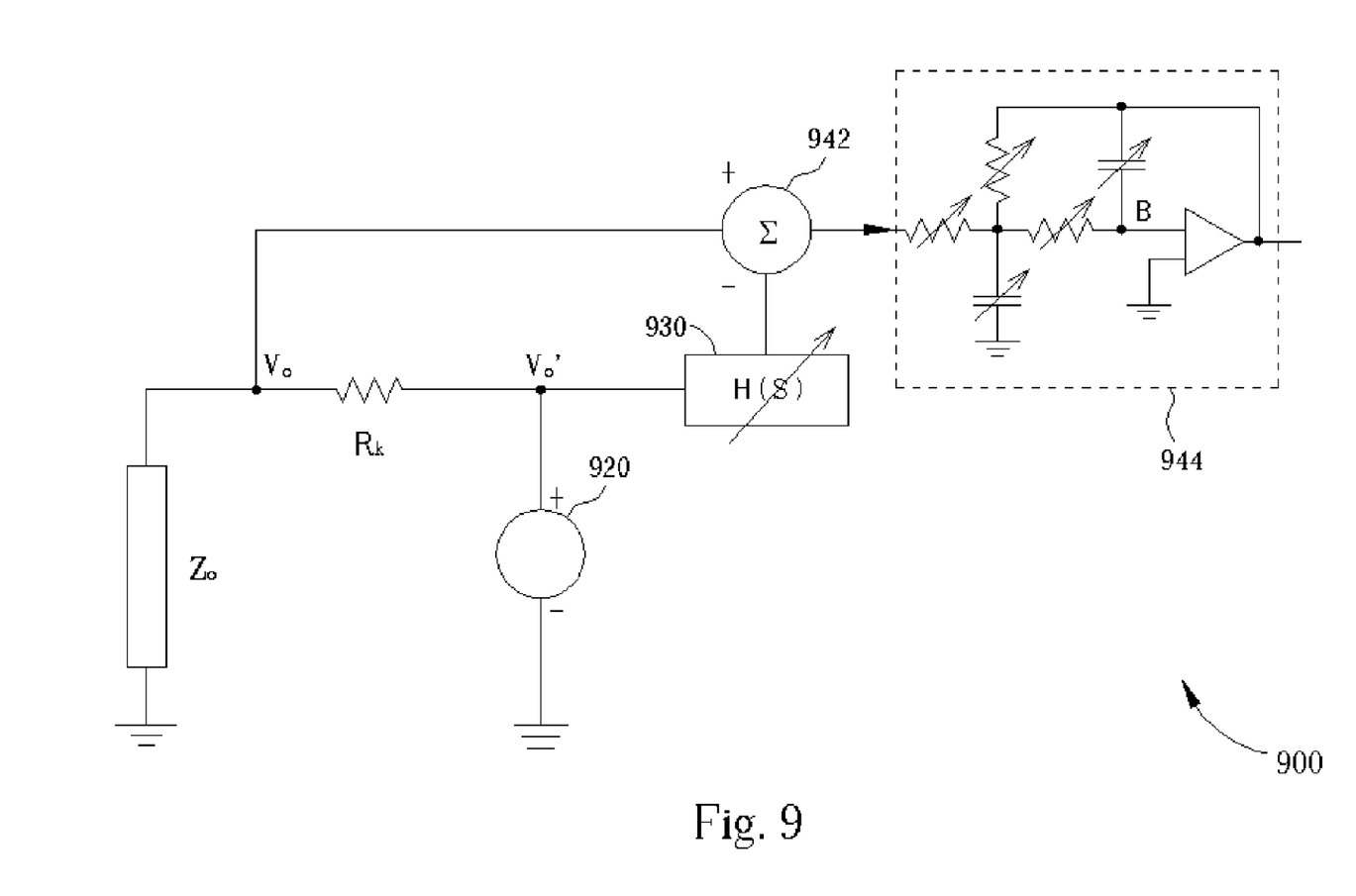
FIG. 9 is a simplified schematic diagram of a transceiver according to a second embodiment of the present invention.

FIG. 9 is a simplified schematic diagram of a transceiver 900 according to a second embodiment of the present invention. A hybrid circuit of the transceiver 900 comprises a line driver 920 for transmitting a transmission signal to the channel via a matching resistor Rk; a cancellation signal generator 930 coupled to the line driver 920 for generating a cancellation signal according to the transmission signal; and a cancellation module 942 coupled to the line driver 920 and the cancellation signal generator 930 for eliminating the echo caused by the transmission signal.

The cancellation signal generator 930 of the present invention generates the cancellation signal according to the signal Vo' outputted from the line driver 920. Then the cancellation signal is transmitted to the cancellation module 942.

Figure 10:
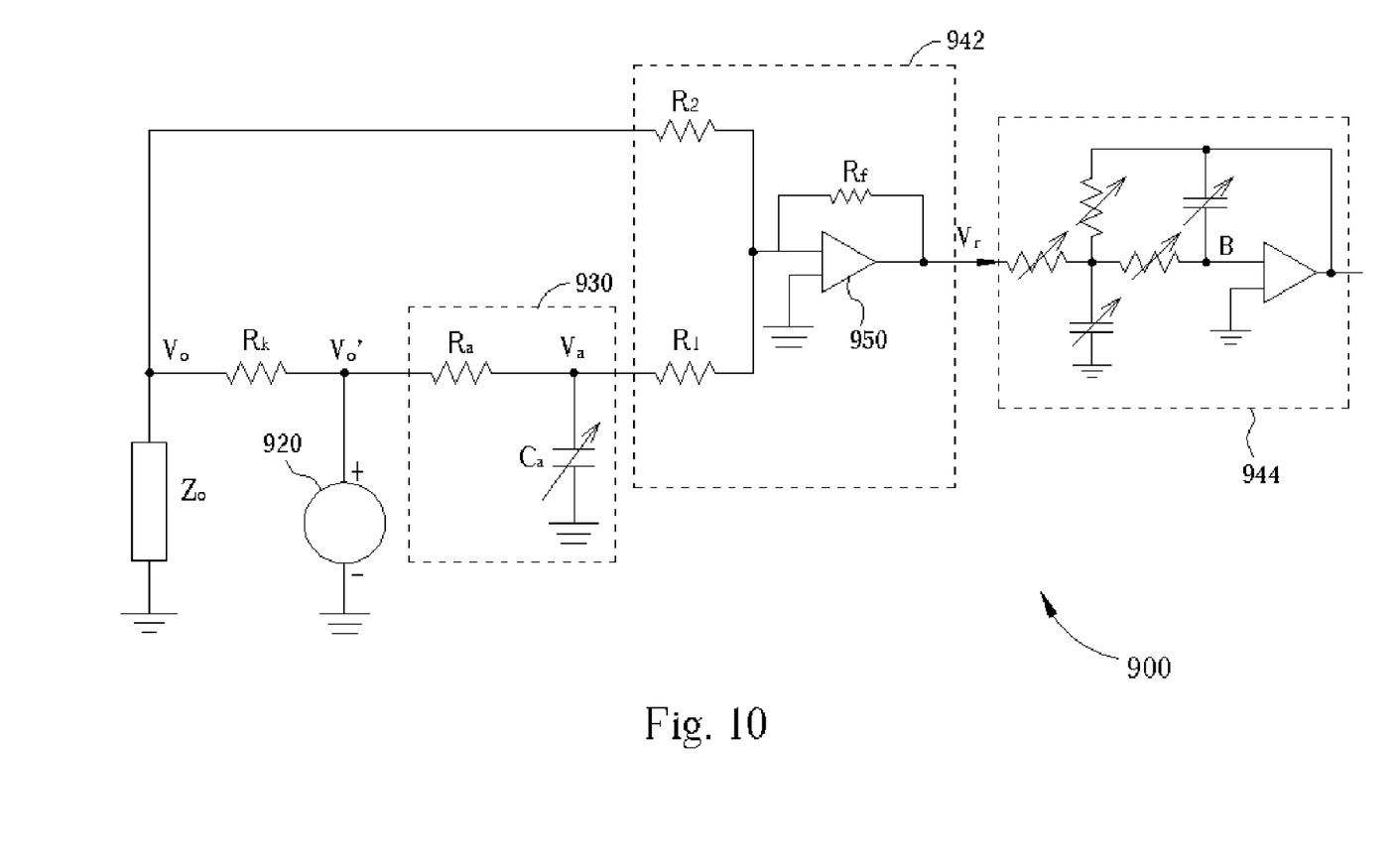
FIG. 10 is an equivalent circuit diagram of the transceiver of FIG. 9.

FIG. 10 depicts an equivalent circuit diagram of the transceiver 900 of the present invention. Preferably, the cancellation signal generator 930 is a RC-network low pass filter having a resistor Ra and a capacitor Ca. The cancellation signal generator 930 is used for generating a cancellation signal Va according to the signal Vo' outputted from the line driver 920. The cancellation signal Va is transmitted to an OP amplifier 950 of the cancellation module 942 via a resistor R1. The transmission signal Vo of the transceiver 900 is transmitted to the OP amplifier 950 via a resistor R2. In the cancellation module 942, a resistor Rf with one end coupled to the input and the other end to the output of the OP amplifier 950 respectively is used for controlling the gain of the OP amplifier 950. The OP amplifier 950 simultaneously performs low pass filtering and signal subtraction. As a result, the following formulas are obtained:

$$Va = \frac{R1}{Ra+R1+sCaRaR1}Vo' \quad (8)$$

-continued $$Va\cdot\frac{Rf}{R1}+Vo\cdot\frac{Rf}{R2} = -Vr \quad (9)$$

Let Vr=0 and by combining the above-mentioned formulas (7), (8) and (9), the following formula is obtained:

$$\frac{1}{Ra+R1+sCaRaR1} = \frac{-Re}{(Re+Rk+sCeReRk)R2} \quad (10)$$

Thus, the echo can be completely cancelled when the two following formulas are satisfied:

CaRaR1=CeRkR2 (11)

$$Ra+R1 = \left(\frac{Rk}{Re}+1\right)R2 \quad (12)$$

In practical implementations, no unit gain buffer is required to be configured between the hybrid circuit of the transceiver 900 and an OP-RC filter 944. Similarly, the OP-RC filter 944 can easily drive a next stage, such as a sample and hold circuit, without an intermediate unit gain buffer and increases the working frequency of the sample and hold circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver in a full duplex communication system, the transceiver comprising:
   a hybrid circuit coupled to a channel for transmitting a transmission signal, receiving a receive signal via the channel, and removing the transmission signal from the receive signal to output a processed receive signal; and
   a gain amplifier having a virtual ground node directly connected to the hybrid circuit, and for amplifying the processed receive signal;
   wherein the gain amplifier comprises an operational amplifier-resistor-capacitor (OP-RC) gain amplifier.

2. The transceiver of claim 1, wherein the gain amplifier has a low output impedance such that the gain amplifier is acted as a driver stage.

3. The transceiver of claim 1, wherein the gain amplifier has a high loop gain.

4. The transceiver of claim 1, wherein the OP-RC gain amplifier comprises:
   an operational amplifier (OP) coupled to the hybrid circuit;
   a resistor in communication with an input and an output of the operational amplifier respectively; and
   a capacitor in communication with the input and the output of the operational amplifier respectively.

5. The transceiver of claim 1, further comprising:
   a filter coupled to the gain amplifier for filtering at least one of a noise and a harmonic component from the signal output from the gain amplifier.

6. The transceiver of claim 5, wherein the filter has a low output impedance such that the filter is acted as a driver stage.

7. The transceiver of claim 5, wherein the filter has a high loop gain.

8. The transceiver of claim 5, further comprising:
an analog-to-digital converter (ADC) coupled to the filter for digitalizing the signal output from the filter.

9. The transceiver of claim 8, further comprising:
a clock recovery circuit coupled to the ADC for providing a sampling clock to the ADC.

10. The transceiver of claim 1, further comprising an echo cancellation module comprising:
a filter for generating a filtered signal according to the transmission signal; and
an echo canceller coupled to the filter for generating a cancellation signal according to the filtered signal.

11. The transceiver of claim 10, wherein the echo canceller comprises:
a pull-up current source for raising a DC level of the echo canceller.

12. The transceiver of claim 10, further comprising an echo residue detector coupled to the echo cancellation module for generating a control signal to control the filter according to an echo residue.

13. The transceiver of claim 12, wherein the filter is a digital filter having a plurality of coefficients and the control signal is employed to adjust the plurality of coefficients of the digital filter.

14. The transceiver of claim 1, further comprising:
a cancellation signal generator for generating a cancellation signal according to the transmission signal; and
a cancellation module coupled to the cancellation signal generator for removing echoes caused by the transmission signal.

15. The transceiver of claim 14, wherein the cancellation module comprises:
an operational amplifier coupled to the cancellation signal generator; and
a resistor having in communication with the input and the output of the operational amplifier respectively.

16. A transceiver in a full duplex communication system, the transceiver comprising:
a hybrid circuit coupled to a channel for transmitting a transmission signal, receiving a receive signal via the channel, and removing the transmission signal from the receive signal to output a processed receive signal;
a gain amplifier having a virtual ground node directly connected to the hybrid circuit, and for amplifying the processed receive signal;
an echo cancellation module, coupled to the gain amplifier, comprising:
a filter for generating a filtered signal according to the transmission signal; and
an echo canceller coupled to the filter for generating a cancellation signal according to the filtered signal;
an echo residue detector for generating a control signal to control the filter according to an echo residue; and
wherein the filter is a digital filter having a plurality of coefficients of infinite impulse response (IIR) or of finite impulse response (FIR), and the control signal is employed to adjust the plurality of coefficients of the digital filter.

17. The transceiver of claim 16, further comprising:
a filter coupled to the gain amplifier for filtering at least one of a noise and a harmonic component from the signal output from the gain amplifier.

18. The transceiver of claim 17, wherein the filter has a low output impedance such that the filter is acted as a driver stage.

19. The transceiver of claim 17, further comprising:
an analog-to-digital converter (ADC) coupled to the filter for digitalizing the signal output from the filter.

20. The transceiver of claim 17, wherein the filter comprises an operational amplifier-resistor-capacitor (OP-RC) gain amplifier.

21. A transceiver in a full duplex communication system, the transceiver comprising:
a hybrid circuit coupled to a channel for transmitting a transmission signal, receiving a receive signal via the channel, and removing the transmission signal from the receive signal to output a processed receive signal;
a gain amplifier having a virtual ground node directly connected to the hybrid circuit, and for amplifying the processed receive signal; and
an echo cancellation circuit, coupled to the gain amplifier, comprising:
a cancellation signal generator for generating a cancellation signal according to the transmission signal; and
a cancellation module coupled to the cancellation signal generator for removing echoes caused by the transmission signal;
wherein the cancellation module comprises:
an operational amplifier coupled to the cancellation signal generator; and
a resistor having in communication with the input and the output of the operational amplifier respectively.

22. The transceiver of claim 21, further comprising:
a filter coupled to the gain amplifier for filtering at least one of a noise and a harmonic component from the signal output from the gain amplifier.

23. The transceiver of claim 21, wherein the filter comprises an operational amplifier-resistor-capacitor (OP-RC) gain amplifier.

24. The transceiver of claim 21, wherein the filter has a low output impedance such that the filter is acted as a driver stage.

25. The transceiver of claim 21, further comprising:
an analog-to-digital converter (ADC) coupled to the filter for digitalizing the signal output from the filter.

* * * * *